United States Patent
Khalid et al.

(10) Patent No.: US 8,149,842 B2
(45) Date of Patent: Apr. 3, 2012

(54) AUTOMATED DISCOVERY OF NETWORK DEVICES SUPPORTING PARTICULAR TRANSPORT LAYER PROTOCOLS

(75) Inventors: Mohamed Khalid, Cary, NC (US); Kenneth Durazzo, San Ramon, CA (US); Randall R. Stewart, Chapin, SC (US); Vivek Datar, Cupertino, CA (US); Ramakrishnan Rajamoni, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 419 days.

(21) Appl. No.: 12/198,067

(22) Filed: Aug. 25, 2008

(65) Prior Publication Data
US 2010/0046511 A1     Feb. 25, 2010

(51) Int. Cl.
H04L 12/28     (2006.01)
(52) U.S. Cl. .............. 370/395.2; 370/346; 370/401
(58) Field of Classification Search .......... 370/466, 370/389, 237, 395.2, 346, 401
See application file for complete search history.

(56) References Cited

U.S. PATENT DOCUMENTS

| 6,768,723 B1 * | 7/2004 | Popovic et al. ............ 370/287 |
| 6,768,726 B2 * | 7/2004 | Dorenbosch et al. ......... 370/331 |
| 6,862,277 B2 * | 3/2005 | Pan et al. ................. 370/352 |
| 7,313,134 B2 * | 12/2007 | Yarlagadda ............... 370/352 |
| 7,359,381 B2 * | 4/2008 | Gadde .................... 370/392 |
| 7,688,838 B1 * | 3/2010 | Aloni et al. ............... 370/412 |
| 7,734,810 B2 * | 6/2010 | Kasturi et al. ............. 709/237 |
| 2005/0169169 A1 * | 8/2005 | Gadde .................... 370/229 |
| 2006/0209853 A1 * | 9/2006 | Hidaka et al. ............. 370/401 |
| 2006/0256817 A1 * | 11/2006 | Durst ..................... 370/466 |
| 2006/0259602 A1 * | 11/2006 | Stewart et al. ............. 709/223 |
| 2008/0028081 A1 * | 1/2008 | Bruss .................... 709/228 |
| 2008/0205445 A1 | 8/2008 | Kumar et al. |

OTHER PUBLICATIONS

Kouda; ("Proxy mechanism of Multiplexing TCP Connections over SatelliteInternet"); Feb. 2002;pp. 1-34.*
Stewart et al., "Stream Control Transmission Protocol (SCTP) Dynamic Address Reconfiguration," RFC 5061, Sep. 2007, 41 pages.
Stewart, ed., "Stream Control Transmission Protocol," RFC 4960, Sep. 2007, 152 pages.
Ong & Yoakum, "An Introduction to the Stream Control Transmission Protocol (SCTP)," RFC 3286, The Internet Society, May 2002, 10 pages.

* cited by examiner

*Primary Examiner* — Ricky Ngo
*Assistant Examiner* — Dewanda Samuel
(74) *Attorney, Agent, or Firm* — The Law Office of Kirk D. Williams (57) ABSTRACT

Disclosed are, inter alia, methods, apparatus, computer-storage media, mechanisms, and means associated with automated discovery of network devices supporting particular transport layer protocols, such as, but not limited to Stream Control Transmission Protocol (SCTP). Packet switching devices automatically discover peer packet switching devices supporting a particular transport layer protocol, and then establish a session using the particular transport layer protocol between them for subsequent use in transporting packets.

19 Claims, 7 Drawing Sheets

AUTOMATED DISCOVERY OF NETWORK DEVICES SUPPORTING PARTICULAR TRANSPORT LAYER PROTOCOLS

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Transmission Control Protocol (TCP) is one transport layer protocol often used in a network in order to transport a byte stream; and Stream Control Transmission Protocol (SCTP) is another transport layer protocol used in a network for transporting multiple message streams in an optimized manner. A router supporting SCTP allows the router to communicate with a peer router using SCTP.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with automated discovery of network devices supporting particular transport layer protocols, such as, but not limited to Stream Control Transmission Protocol (SCTP). One embodiment includes multiple interfaces for sending and receiving packets; and one or more control processors and memory. One embodiment is configured for performing operations including: (a) receiving a packet being sent from a first host to a second host in a network, with said packet corresponding to requesting a session be established using a first transport layer protocol or belonging to a session using the first transport layer protocol; (b) based on said received packet, determining whether or not a second networked device that supports transportation of packets a second transport layer protocol is on a path through the network from the apparatus towards the second networked device; (c) in response to said determining that there is such a second networked device, establishing a second layer transport session using the second transport protocol between the apparatus and the second networked device; and (d) communicating a plurality of packets over said path through the network with the second networked device using said established second layer transport session.

In one embodiment, the second transport layer protocol is Stream Control Transmission Protocol (SCTP). In one embodiment, said determining whether or not the second networked device that supports transportation of packets using the second transport layer protocol is on the path through the network from the apparatus towards the second networked device includes: (a) sending a probe packet from the apparatus towards the second host, with the probe packet including an indication of the second layer transport protocol; and (b) receiving a response from the second networked device indicating its support of the second layer transport protocol. In one embodiment, said establishing the second layer transport session includes authenticating that the second layer transport session is authorized to be established between the apparatus and the second networked device. In one embodiment, the plurality of packets are being communicated between the first host and the second host using Transmission Control Protocol (TCP). In one embodiment, the first transport layer protocol is Transmission Control Protocol (TCP); and said received packet is a TCP SYN message attempting to establish a TCP connection between the first host and the second host. In one embodiment, said operations comprise registering the support of the second transport protocol of the apparatus with a configuration server; and receiving information from the configuration server that second network device supports the second transport protocol; and wherein said operation of determining whether or not the second networked device that supports transportation of packets the second transport layer protocol includes referencing said received information from the configuration server that second network device supports the second transport protocol. In one embodiment, the packet being sent from the first host to the second host includes information requesting a first transport layer session be established using the first transport layer protocol, and wherein said operations include: forwarding the packet being sent from the first host to the second host, and forwarding packets belonging to the first transport layer session between the first host and the second host but not using said second layer transport session. In one embodiment, the first transport layer protocol is Transmission Control Protocol (TCP); and wherein said received packet is a TCP SYN message attempting to establish a TCP connection between the first host and the second host.

2. Description

Disclosed are, inter alia, methods, apparatus, computer-storage media, mechanisms, and means associated with automated discovery of network devices supporting particular transport layer protocols, such as, but not limited to Stream Control Transmission Protocol (SCTP). Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Note, nothing described or referenced in this document is admitted as prior art to this application unless explicitly so stated.

Disclosed are, inter alia, methods, apparatus, computer-storage media, mechanisms, and means associated with automated discovery of network devices supporting particular transport layer protocols, such as, but not limited to Stream Control Transmission Protocol (SCTP). One embodiment includes an apparatus, comprising: a plurality of interfaces for sending and receiving packets; and one or more control processors and memory. One embodiment of the apparatus is configured for performing operations including: receiving a packet being sent from a first host to a second host in a network, said packet corresponding to a request that a session be established using a first transport layer protocol or belonging to an already established session using the first transport layer protocol; in response to said received packet: (a) determining that a second networked device that supports transportation of packets using a second transport layer protocol is on a path through the network from the apparatus towards the second host; and (b) establishing a second layer transport session using the second transport protocol between the apparatus and the second networked device; and communicating a plurality of packets between the apparatus and the second networked device using said established second layer transport session.

In one embodiment, the second transport layer protocol is Stream Control Transmission Protocol (SCTP). In one embodiment, said determining that the second networked device supports transportation of packets using the second transport layer protocol is on a path through the network from the apparatus towards the second host includes: (a) sending a probe packet from the apparatus towards the second host attempting to identify a networked device along the path supporting the second layer transport protocol; and (b) receiving a response from the second networked device representing its support of the second layer transport protocol. In one embodiment, said establishing the second layer transport session includes authenticating that the second layer transport session is authorized to be established between the apparatus and the second networked device. In one embodiment, the plurality of packets are being communicated between the first host and the second host using Transmission Control Protocol (TCP). In one embodiment, the first transport layer protocol is Transmission Control Protocol (TCP); and said received packet is a TCP SYN message attempting to establish a TCP connection between the first host and the second host.

In one embodiment, said determining that the second networked device supports transportation of packets using the second transport layer protocol is on a path through the network from the apparatus towards the second host includes: (a) sending a probe packet from the apparatus towards the second host attempting to identify a networked device along the path supporting the second layer transport protocol; and (b) receiving a response from the second networked device representing its support of the second layer transport protocol. In one embodiment, said operations comprise: registering the support of the second transport protocol of the apparatus with a configuration server; and receiving information from the configuration server that second network device supports the second transport protocol; and wherein said determining that the second networked device supports transportation of packets using the second transport layer protocol is on a path through the network from the apparatus towards the second host includes referencing said received information from the configuration server that second network device supports the second transport protocol. In one embodiment, the second transport layer protocol is Stream Control Transmission Protocol (SCTP).

In one embodiment, the packet being sent from the first host to the second host includes information requesting a first transport layer session be established using the first transport layer protocol; and wherein said operations include forwarding the packet being sent from the first host to the second host without using said second layer transport session. In one embodiment, said operations include: forwarding a plurality of packets belonging to the first transport layer session between the first host and the second host without using said second layer transport session. In one embodiment, the second transport layer protocol is Stream Control Transmission Protocol (SCTP). In one embodiment, the first transport layer protocol is Transmission Control Protocol (TCP); and wherein said received packet is a TCP SYN message attempting to establish a TCP connection between the first host and the second host. In one embodiment, the second transport layer protocol is Stream Control Transmission Protocol (SCTP); and wherein the first transport layer protocol is Transmission Control Protocol (TCP); and wherein said received packet is a TCP SYN message attempting to establish a TCP connection between the first host and the second host.

One embodiment performs operations, including: in response to packet traffic being passed through a packet switching device towards a destination using a first transport layer protocol: the packet switching device forwarding said packet traffic to the destination, and subsequently determining that a second packet switching device that supports a second transport layer protocol, different from the first transport layer protocol, that can be used to carry future packet traffic towards the destination exists along a path towards the destination; in response to said determination regarding the second packet switching device, establishing a session using the second transport layer protocol between the packet switching device and the second packet switching device; and after said establishment of said second transport layer protocol session, the packet switching device forwarding a plurality of packets to the second packet switching device over said second transport layer protocol session.

In one embodiment, the second transport layer protocol is Stream Control Transmission Protocol (SCTP). In one embodiment, the first transport layer protocol is Transmission Control Protocol (TCP). In one embodiment, said determination by the packet switching device that the second packet switching device exists along a path towards the destination is triggered by said packet traffic including a Transmission Control Protocol (TCP) session initiation packet. In one embodiment, said determination by the packet switching device that the second packet switching device exists along a path towards the destination includes: (a) sending a probe packet from the packet switching device along a path towards the destination attempting to identify a networked device supporting the second layer transport protocol, with the probe packet being received by the second packet switching device; and (b) receiving a response from the second packet switching device representing its support of the second layer transport protocol. In one embodiment, the second transport layer protocol is Stream Control Transmission Protocol (SCTP). One embodiment includes receiving information from the configuration server that second packet switching device supports the second transport protocol; and wherein said determination by the packet switching device that the second packet switching device exists along a path towards the destination includes referencing said received information from the configuration server that second packet switching device supports the second transport protocol. In one embodiment, the second transport layer protocol is Stream Control Transmission Protocol (SCTP).

One embodiment includes an apparatus, comprising: means for receiving a packet being sent from a first host to a second host in a network, said packet corresponding to requesting a session be established using a first transport layer protocol or belonging to a session using the first transport layer protocol; means for determining, in response to said received packet, whether or not a second networked device that supports transportation of packets using a second transport layer protocol is on a path through the network from the apparatus towards the second host; means for establishing a second layer transport session using the second transport protocol between the apparatus and the second networked device in response to said determining that there is such a second networked device; and means for communicating a plurality of packets over said path through the network with the second networked device using said established second layer transport session.

In one embodiment, the second transport layer protocol is Stream Control Transmission Protocol (SCTP). In one embodiment, the plurality of packets are being communicated between the first host and the second host using Transmission Control Protocol (TCP). In one embodiment, said received packet is a TCP SYN message attempting to establish a TCP connection between the first host and the second host. In one embodiment, said means for determining whether or not the second networked device that supports transportation of packets using the second transport layer protocol is on a path through the network from the apparatus towards the host includes: means for sending a probe packet from the apparatus towards the second host attempting to identify a networked device supporting the second layer transport protocol; and means for receiving a response from the second packet switching device representing its support of the second layer transport protocol. In one embodiment, the plurality of packets are being communicated between the first host and the second host using Transmission Control Protocol (TCP). In one embodiment, said received packet is a TCP SYN message attempting to establish a TCP connection between the first host and the second host.

In one embodiment, said means for determining whether or not the second networked device that supports transportation of packets using the second transport layer protocol is on a path through the network from the apparatus towards the host includes: means for sending a probe packet from the apparatus towards the second host attempting to identify a networked device supporting the second layer transport protocol; and means for receiving a response from the second packet switching device representing its support of the second layer transport protocol. One embodiment includes means for registering the support of the second transport protocol of the apparatus with a configuration server, and receiving information from the configuration server that second network device supports the second transport protocol; and wherein said means for determining whether or not the second networked device that supports transportation of packets the second transport layer protocol includes means for referencing said received information from the configuration server that second network device supports the second transport protocol. In one embodiment, the second transport layer protocol is Stream Control Transmission Protocol (SCTP).

Figure 1A:
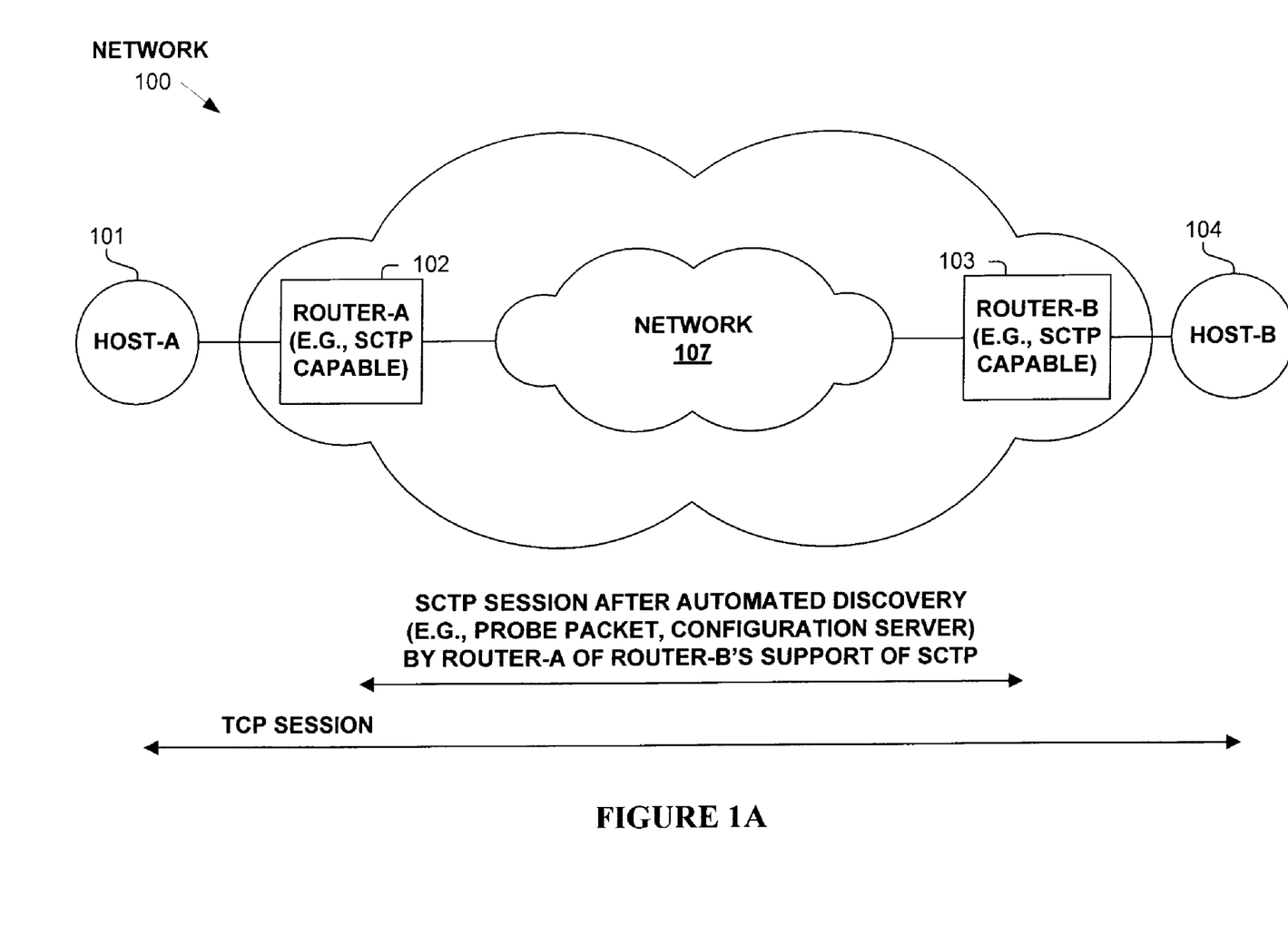
FIG. 1A illustrates an example network operating according to one embodiment.

Expressly turning to the figures, FIG. 1A illustrates an example network 100 operating according to one embodiment. As shown, network 100 includes Host-A 101 communicatively coupled to Router-A 102, which is communicatively coupled via network 107 to Router-B 103, which is communicatively coupled to Host-B 104. Routers 102 and 103 are configured to automatically discover (e.g., using probe packets, a configuration server, etc.) each other and their mutual support for a particular network layer protocol. Note, the use of SCTP by one embodiment is expansively described herein, but one embodiment is not limited to the specific use of SCTP as its automatically discovered network layer protocol by a peer packet switching device.

In one embodiment the automated discovery of a peer packet switching device supporting a particular network layer protocol is triggered by packet traffic between two hosts (101 and 104). One of the routers (102, 103) observes such packet traffic, and in response sends a probe packet identifying the particular network layer protocol towards the destination, which is responded to by the other router (102, 103), and then a session is established using the particular network layer protocol between the two routers. In one embodiment, such packet traffic triggers communication with a configuration server to discover a peer packet switching device and its support for the particular network layer protocol.

Figure 1B:
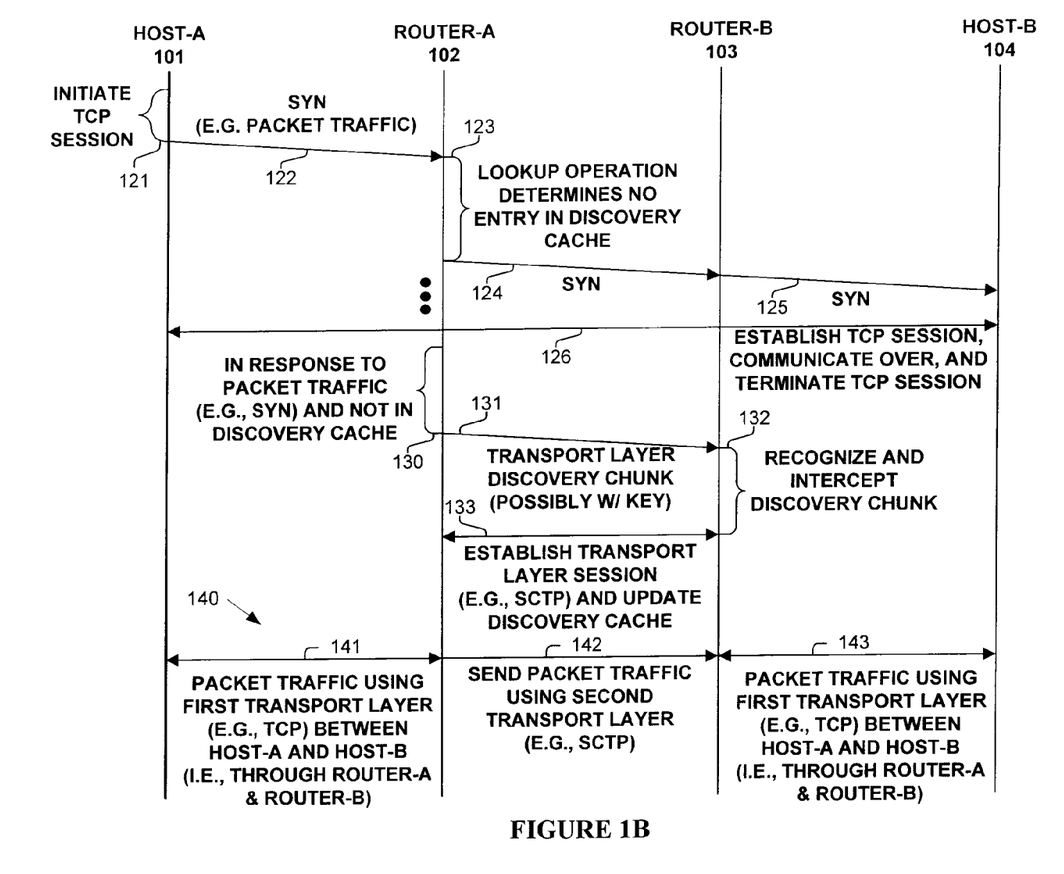
FIG. 1B illustrates the operation of a network according to one embodiment.

FIG. 1B further describes the operation of one embodiment of network 100. As shown, Host-A 101 determines to, and initiates (121) the establishment of a TCP session with Host-B 104. Host-A 101 sends (122) a TCP SYN packet (e.g., one form of packet traffic between Host-A 101 and Host-B 104) towards Host-B 104. Router-A 102 observes this packet traffic. In this example, Router-A 102 performs a lookup operation (123) in its discovery cache, and determines that no optimized network layer protocol session has been established for it to use to send packets to the destination address of the TCP SYN packet. Router-A 102 forwards (124) the TCP SYN packet to Router-B 103, which forwards (125) it to Host-B 104. Host-A 101 and Host-B 104 establish and communicate (126) over a TCP session.

However, this packet traffic (e.g., the TCP SYN packet in this example) and the lack of a prior-established optimized network layer protocol session triggers (130) the automatic discovery by Router-A 102 of a packet switching device along the path through the network to be travelled by the packet traffic. Router-A 102 sends (131) a transport layer discover chunk specifying the particular network layer protocol (e.g., SCTP), possibly including some configuration parameters (e.g., prefixes served by the packet switching device, compression methods, optimization technique, etc.), in a packet having a destination address of that of the triggering packet traffic, and typically a source address of the original packet traffic or that of Router-A 102. The address of Router-A 102 is typically included in the discovery chunk if it is not used as the source address so that another packet switching device can identify its potential peer. Additionally, in one embodiment, the probe packet includes authentication information, such as, but not limited to a public key so that only two similarly authorized peer packet switching devices will be able to establish a session between themselves using the particular network layer protocol (with such authentication being performed by Router-A 102 and Router-B 103).

The packet including the discovery chunk is routed through a network towards Host-B 104, and is recognized and intercepted (132) by Router-B 103 as it supports the specified network layer protocol. Router-A 102 and Router-B 103 establish (133) a session using the specified network layer protocol (e.g., SCTP), and each update their discovery cache such that at least certain packets being communicated between them will use the particular network layer protocol session. For example, a subsequent TCP session 140 between Host-A 101 and Host-B 104 will use (141) TCP (e.g., a first transport layer protocol) between Host-A 101 and Router-A 102, use (142) the second transport layer protocol session (e.g., SCTP) between Router-A 102 and Router-B 103, and use (143) TCP (e.g., a first transport layer protocol) between Router-B 103 and Host-B 104.

Figure 2A:
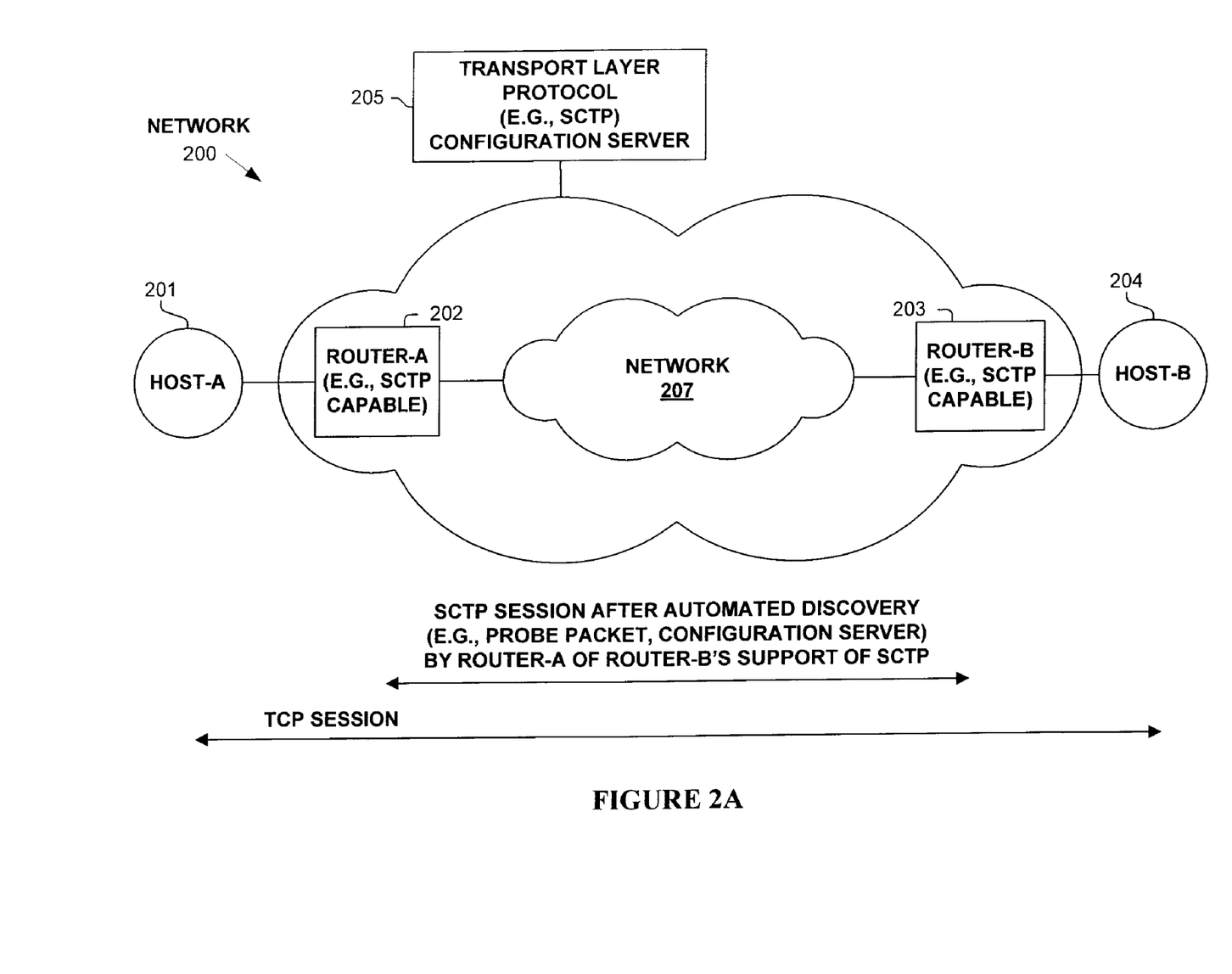
FIG. 2A illustrates an example network operating according to one embodiment.

FIG. 2A illustrates an example network 200 operating according to one embodiment. Network 200 is similar to network 100 of FIG. 1A, with the addition of a transport layer protocol Configuration Server 205, for providing network layer protocol information for Router-A 202 and Router-B 203, such that they can discover each other and establish a transport layer protocol session between them, typically either initially or in response to packet traffic. As shown, network 200 includes Host-A 201 communicatively coupled to Router-A 202, which is communicatively coupled via network 207 to Router-B 203, which is communicatively coupled to Host-B 204. Routers 202 and 203 are configured to automatically discover (e.g., using probe packets, Configuration Server 205, etc.) each other and their mutual support for a particular network layer protocol.

Figure 2B:
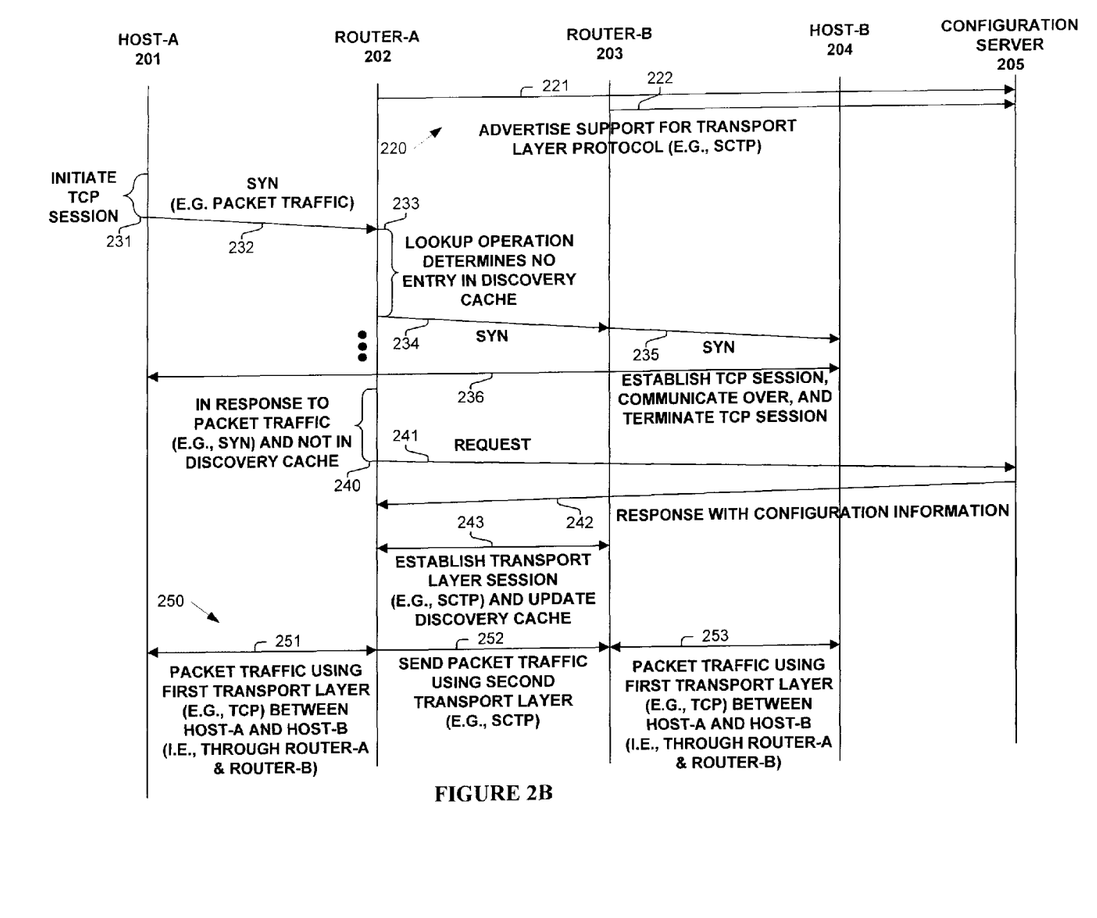
FIG. 2B illustrates the operation of a network according to one embodiment.

FIG. 2B further illustrates network 200 (FIG. 2A) operating according to one embodiment. As shown, Router-A 202 and Router-B 203 advertise (220, 221, 222) their respective support of a particular transport layer protocol (e.g., SCTP), typically as part of an initialization, periodic or other process. Subsequently, Host-A 201 determines to, and initiates (231) the establishment of a TCP session with Host-B 204. Host-A 201 sends (232) a TCP SYN packet (e.g., one form of packet traffic between Host-A 201 and Host-B 204) towards Host-B 204. Router-A 202 observes this packet traffic. In this example, Router-A 202 performs a lookup operation (233) in its discovery cache, and determines that no optimized network layer protocol session has been established for it to use to send packets to the destination address of the TCP SYN packet. Router-A 202 forwards (234) the TCP SYN packet to Router-B 203, which forwards (235) it to Host-B 204. Host-A 201 and Host-B 204 establish and communicate (236) over a TCP session.

However, this packet traffic (e.g., the TCP SYN packet in this example) and the lack of a prior-established optimized network layer protocol session triggers (240) the automatic discovery by Router-A 202 of a packet switching device along the path through the network to be travelled by the packet traffic. Router-A 202 sends (241) a request to Configuration Server 205, possibly including some configuration parameters (e.g., prefixes served by the packet switching device, compression methods, optimization technique, etc.), for information as to whether or not there exists a peer packet switching device supporting the particular network layer protocol (e.g., SCTP) for Router-A 202 on the path to the destination of the packet traffic (i.e., Host-B 204 in this example). Configuration Server 205 provides a response (242), possibly including some configuration parameters (e.g., prefixes served by the packet switching device, compression methods, optimization technique, etc.), to Router-A 202 including the address or other identification of Router-B 203. Additionally, in one embodiment, response 242 includes authentication information, such as, but not limited to a public key so that only two similarly authorized peer packet switching devices will be able to establish a session between themselves using the particular network layer protocol (with such authentication being performed by Router-A 202 and Router-B 203).

Router-A 202 and Router-B 203 establish (243) a session using the specified network layer protocol (e.g., SCTP), and each update their discovery cache such that at least certain packets being communicated between them will use the particular network layer protocol session. For example, a subsequent TCP session 250 between Host-A 201 and Host-B 204 will use (251) TCP (e.g., a first transport layer protocol) between Host-A 201 and Router-A 202, use (252) the second transport layer protocol session (e.g., SCTP) between Router-A 202 and Router-B 203, and use (253) TCP (e.g., a first transport layer protocol) between Router-B 203 and Host-B 204.

Figure 2C:
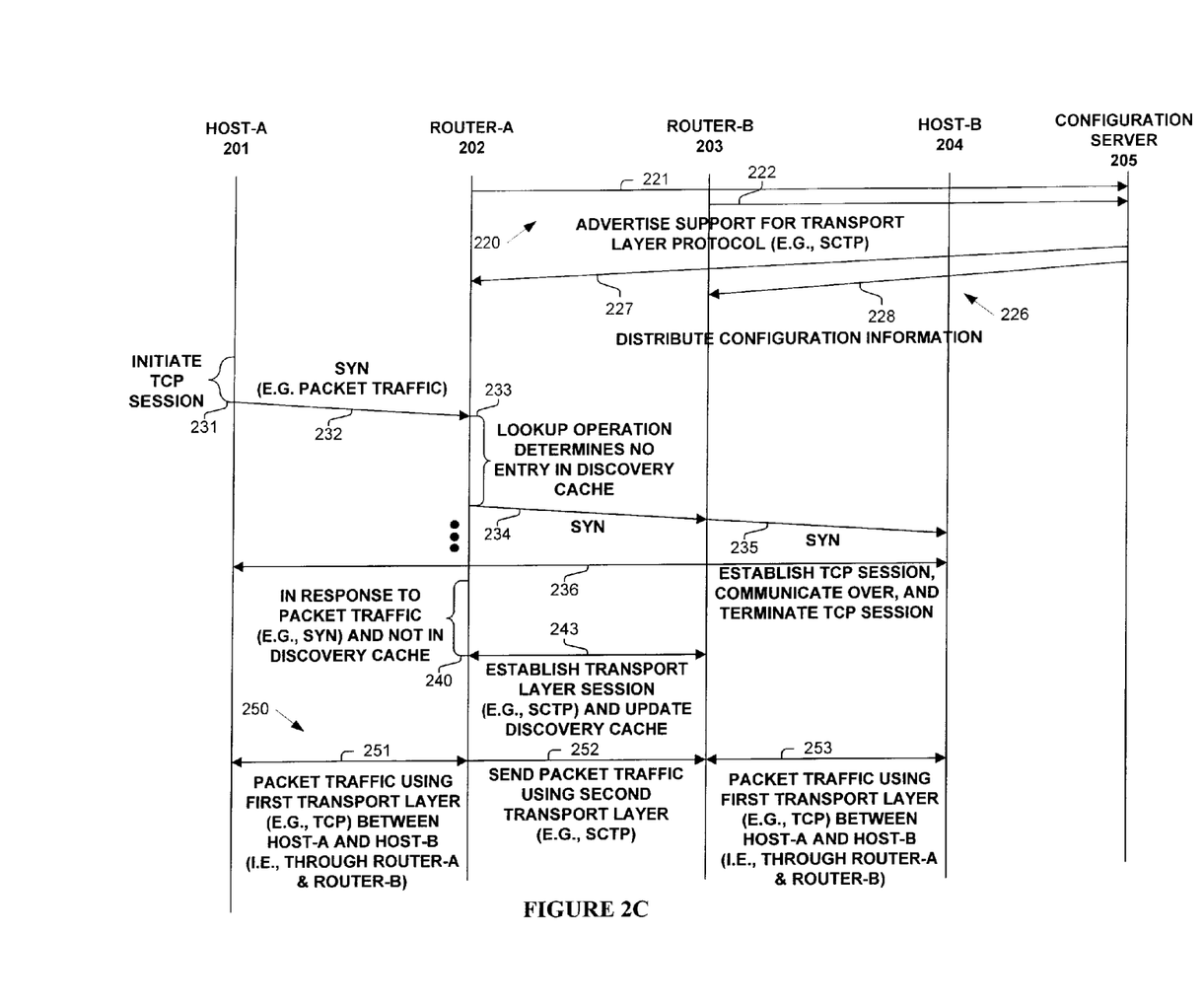
FIG. 2C illustrates the operation of a network according to one embodiment.

FIG. 2C further illustrates the operation of network 200 (FIG. 2A) operating according to one embodiment. The one embodiment illustrated in FIG. 2C is similar to that illustrated in FIG. 2B, with a difference being that the configuration information is automatically distributed to the routers from the configuration server, rather than in response to a query responsive to packet traffic as previously illustrated. Turning to FIG. 2C, as shown, Router-A 202 and Router-B 203 advertise (220, 221, 222) their respective support of a particular transport layer protocol (e.g., SCTP), typically as part of an initialization, periodic or other process. Configuration Server 205, automatically initially and/or periodically, distributes (226, 227, 228) the peering possibilities (and possibly configuration information) to Router-A 202 and Router-B 203. The illustrated one embodiment thus has the potential peering information, so that it does not need to query Configuration Server 205 in response to packet traffic. FIG. 2C operates in a manner described in relation to FIG. 2B to establish and use the particular transport layer protocol session.

Figure 2D:
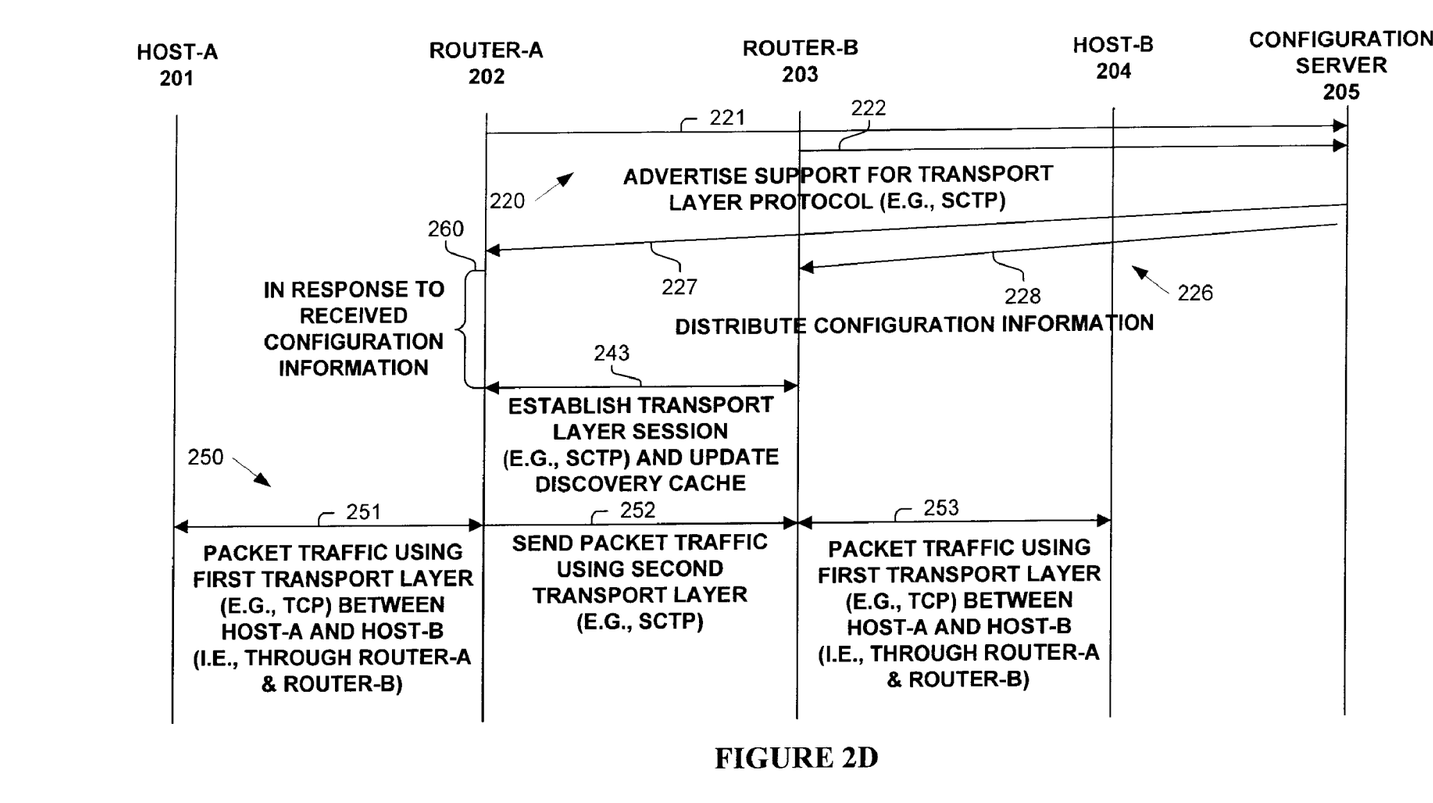
FIG. 2D illustrates the operation of a network according to one embodiment.

FIG. 2D further illustrates the operation of network 200 (FIG. 2A) operating according to one embodiment. The one embodiment illustrated in FIG. 2D is similar to that illustrated in FIG. 2C, with a difference being that the particular transport layer protocol session is automatically established in response to the received configuration information, rather than in response to packet traffic as illustrated in FIG. 2C. More specifically, turning to FIG. 2C, as shown, Router-A 202 and Router-B 203 advertise (220, 221, 222) their respective support of a particular transport layer protocol (e.g., SCTP), typically as part of an initialization, periodic or other process. Configuration Server 205, automatically initially and/or periodically, distributes (226, 227, 228) the peering possibilities (and possibly configuration information) to Router-A 202 and Router-B 203. In response to receipt of such configuration information (260), Router-A 202 and Router-B 203 establish (243) a session using the specified network layer protocol (e.g., SCTP), and each update their discovery cache such that at least certain packets being communicated between them will use the particular network layer protocol session. For example, a subsequent TCP session 250 between Host-A 201 and Host-B 204 will use (251) TCP (e.g., a first transport layer protocol) between Host-A 201 and Router-A 202, use (252) the second transport layer protocol session (e.g., SCTP) between Router-A 202 and Router-B 203, and use (253) TCP (e.g., a first transport layer protocol) between Router-B 203 and Host-B 204.

Figure 3:
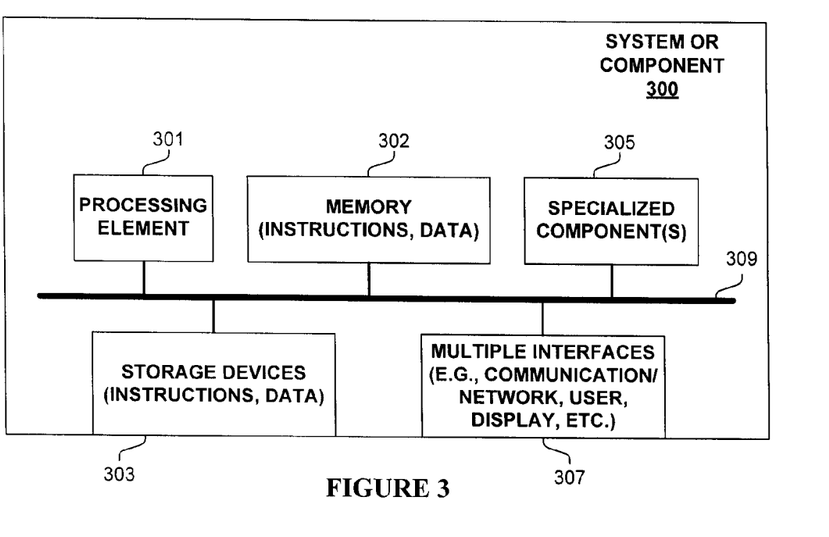
FIG. 3 illustrates an example system or component used in one embodiment.

FIG. 3 is block diagram of a system or component 300 used in one embodiment using automated discovery of network devices supporting particular transport layer protocols, such as, but not limited to Stream Control Transmission Protocol (SCTP). In one embodiment, system or component 300 performs one or more processes corresponding to one of the flow diagrams illustrated or otherwise described herein.

In one embodiment, system or component 300 includes a processing element 301, memory 302, storage devices 303, specialized components 305 (e.g. optimized hardware such as for performing classification operations for identifying SCTP or other transport layer protocol messages, etc.), and interface(s) 307 for communicating information (e.g., sending and receiving packets, user-interfaces, displaying information, etc.), which are typically communicatively coupled via one or more communications mechanisms 309, with the communications paths typically tailored to meet the needs of the application.

Various embodiments of component 300 may include more or less elements. The operation of component 300 is typically controlled by processing element 301 using memory 302 and storage devices 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising: a plurality of interfaces for sending and receiving packets; and one or more control processors and memory; wherein the apparatus is configured for performing operations including:

receiving a packet being sent from a first host to a second host in a network, said packet corresponding to a request that a session be established using a first transport layer protocol or belonging to an already established session using the first transport layer protocol;

in response to said received packet: (a) determining that a second networked device that supports transportation of packets using a second transport layer protocol is on a path through the network from the apparatus towards the second host; and (b) establishing a second layer transport session using the second transport protocol between the apparatus and the second networked device; and communicating a plurality of packets between the apparatus and the second networked device using said established second layer transport session;

wherein said determining that the second networked device supports transportation of packets using the second transport layer protocol is on a path through the network from the apparatus towards the second host includes: (a) sending a probe packet from the apparatus towards the second host attempting to identify a networked device along the path supporting the second layer transport protocol; and (b) receiving a response from the second networked device representing its support of the second layer transport protocol.

2. The apparatus of claim 1, wherein the second transport layer protocol is Stream Control Transmission Protocol (SCTP).

3. The apparatus of claim 2, wherein said establishing the second layer transport session includes authenticating that the second layer transport session is authorized to be established between the apparatus and the second networked device.

4. The apparatus of claim 2, wherein the plurality of packets are being communicated between the first host and the second host using Transmission Control Protocol (TCP).

5. The apparatus of claim 2, wherein the first transport layer protocol is Transmission Control Protocol (TCP); and said received packet is a TCP SYN message attempting to establish a TCP connection between the first host and the second host.

6. The apparatus of claim 1, wherein the packet being sent from the first host to the second host includes information requesting a first transport layer session be established using the first transport layer protocol; and wherein said operations include forwarding the packet being sent from the first host to the second host without using said second layer transport session.

7. The apparatus of claim 6, wherein said operations include:
forwarding a plurality of packets belonging to the first transport layer session between the first host and the second host without using said second layer transport session.

8. The apparatus of claim 7, wherein the second transport layer protocol is Stream Control Transmission Protocol (SCTP).

9. The apparatus of claim 8, wherein the first transport layer protocol is Transmission Control Protocol (TCP); and wherein said received packet is a TCP SYN message attempting to establish a TCP connection between the first host and the second host.

10. The apparatus of claim 6, wherein the second transport layer protocol is Stream Control Transmission Protocol (SCTP); and wherein the first transport layer protocol is Transmission Control Protocol (TCP); and wherein said received packet is a TCP SYN message attempting to establish a TCP connection between the first host and the second host.

11. The apparatus of claim 1, wherein the apparatus is a packet switching device; and wherein the apparatus, first host, second host, and the second networked device are separate appliances.

12. An apparatus, comprising: a plurality of interfaces for sending and receiving packets; and one or more control processors and memory; wherein the apparatus is configured for performing operations including:
receiving a packet being sent from a first host to a second host in a network, said packet corresponding to a request that a session be established using a first transport layer protocol or belonging to an already established session using the first transport layer protocol;
in response to said received packet: (a) determining that a second networked device that supports transportation of packets using a second transport layer protocol is on a path through the network from the apparatus towards the second host; and (b) establishing a second layer transport session using the second transport protocol between the apparatus and the second networked device; and
communicating a plurality of packets between the apparatus and the second networked device using said established second layer transport session;
wherein said operations comprise: registering the support of the second transport protocol of the apparatus with a configuration server; and receiving information from the configuration server that second network device supports the second transport protocol; and
wherein said determining that the second networked device supports transportation of packets using the second transport layer protocol is on a path through the network from the apparatus towards the second host includes referencing said received information from the configuration server that second network device supports the second transport protocol.

13. The apparatus of claim 12, wherein the second transport layer protocol is Stream Control Transmission Protocol (SCTP).

14. A method, comprising:
in response to packet traffic being passed through a packet switching device towards a destination using a first transport layer protocol: the packet switching device forwarding said packet traffic to the destination, and subsequently determining that a second packet switching device supports a second transport layer protocol, different from the first transport layer protocol, that can be used to carry future packet traffic towards the destination exists along a path towards the destination;
in response to said determination regarding the second packet switching device, establishing a session using the second transport layer protocol between the packet switching device and the second packet switching device; and
after said establishment of said second transport layer protocol session, the packet switching device forwarding a plurality of packets to the second packet switching device over said second transport layer protocol session;
wherein said determination by the packet switching device that the second packet switching device exists along a path towards the destination includes: (a) sending a probe packet from the packet switching device along a path towards the destination attempting to identify a networked device supporting the second layer transport protocol, with the probe packet being received by the second packet switching device; and (b) receiving a response from the second packet switching device representing its support of the second layer transport protocol.

15. The method of claim 14, wherein the second transport layer protocol is Stream Control Transmission Protocol (SCTP); and where said determination by the packet switching device that the second packet switching device exists along a path towards the destination is triggered by said packet traffic including a Transmission Control Protocol (TCP) session initiation packet.

16. The method of claim 14, wherein the second transport layer protocol is Stream Control Transmission Protocol (SCTP).

17. A method, comprising:
receiving information by a packet switching device from a configuration server that a second packet switching device supports a second transport protocol;
in response to packet traffic being passed through the packet switching device towards a destination using a first transport layer protocol: the packet switching device forwarding said packet traffic to the destination, and subsequently determining that the second packet switching device supports the second transport layer protocol, different from the first transport layer protocol, that can be used to carry future packet traffic towards the destination exists along a path towards the destination; wherein said determination by the packet switching device that the second packet switching device exists along a path towards the destination includes referencing said received information from the configuration server that second packet switching device supports the second transport protocol;
in response to said determination regarding the second packet switching device, establishing a session using the second transport layer protocol between the packet switching device and the second packet switching device; and
after said establishment of said second transport layer protocol session, the packet switching device forwarding a plurality of packets to the second packet switching device over said second transport layer protocol session.

18. The method of claim 17, wherein the second transport layer protocol is Stream Control Transmission Protocol (SCTP).

19. The method of claim 17, wherein the second transport layer protocol is Stream Control Transmission Protocol (SCTP); and where said determination by the packet switching device that the second packet switching device exists along a path towards the destination is triggered by said packet traffic including a Transmission Control Protocol (TCP) session initiation packet.

\* \* \* \* \*